UNITED STATES PATENT OFFICE.

RUDOLF KNIETSCH AND MAXIMILIAN SCHARFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

PROCESS OF MAKING SULFURYL CHLORID.

SPECIFICATION forming part of Letters Patent No. 716,248, dated December 16, 1902.

Application filed November 29, 1901. Serial No. 84,118. (No specimens.)

*To all whom it may concern:*

Be it known that we, RUDOLF KNIETSCH, a subject of the King of Prussia, German Emperor, and MAXIMILIAN SCHARFF, a subject of the King of Saxony, both doctors of philosophy and chemists, and residing at Ludwigshafen-on-the-Rhine, in the Kingdom of Bavaria, Germany, have invented new and useful Improvements in the Manufacture of Sulfuryl Chlorid, of which the following is a specification.

Our invention relates to improvements in the manufacture of sulfuryl chlorid. The methods hitherto known for the preparation of this body consists in passing gaseous sulfur dioxid and gaseous chlorin into glacial acetic acid (see Melsen's *Compt. Rendu.* 76, page 92) or in allowing these gases either alternately or in admixture with one another to act on camphor. (See Schulze, *Journal für Praktische Chemie*, Vol. 24, page 168.) In both cases, however, considerable time and strict attention are necessary to obtain a satisfactory yield of sulfuryl chlorid. We have found that these difficulties are avoided and the reaction caused to proceed almost instantaneously and quantitatively when sulfur dioxid and chlorin are allowed to react on one another in the liquid condition in the presence of bodies which promote their union, which can be such as promote their union when in the gaseous condition—for example, camphor, glacial acetic acid, and anhydrous formic acid.

The following example will serve to further illustrate the nature of our invention and the manner in which the same may be carried out into practical effect; but the invention is not confined to this example.

Example: In a closed vessel dissolve some camphor in liquid sulfur dioxid, and into this solution introduce the calculated quantity of liquid chlorin in a fairly-strong jet, preferably while cooling. The formation of sulfuryl chlorid is almost instantaneous and can be recognized by the decrease in the pressure which takes place. The product so obtained can be isolated and purified in any known or suitable manner.

Now what we claim is—

1. The process for the manufacture of sulfuryl chlorid by causing liquid chlorin and liquid sulfur dioxid to react on one another in the presence of bodies which promote their union.

2. The process for the manufacture of sulfuryl chlorid by causing liquid chlorin and liquid sulfur dioxid to react on one another in the presence of camphor.

In testimony whereof we have hereunto set our hands in the presence of two subscribing witnesses.

RUDOLF KNIETSCH,
MAXIMILIAN SCHARFF.

Witnesses:
BERNHARD C. HESSE,
JACOB ADRIAN.